(12) United States Patent
Schlarb et al.

(10) Patent No.: US 8,108,434 B2
(45) Date of Patent: *Jan. 31, 2012

(54) DYNAMIC NODE EXTENSIONS AND EXTENSION FIELDS FOR BUSINESS OBJECTS

(75) Inventors: Uwe Schlarb, Östringen (DE); Stefan A. Baeuerle, Rauenberg (DE)

(73) Assignee: SAP AG, Walldorf (DE)

( * ) Notice: Subject to any disclaimer, the term of this patent is extended or adjusted under 35 U.S.C. 154(b) by 423 days.

This patent is subject to a terminal disclaimer.

(21) Appl. No.: 12/198,351

(22) Filed: Aug. 26, 2008

(65) Prior Publication Data

US 2010/0057771 A1     Mar. 4, 2010

(51) Int. Cl.
 G06F 7/00      (2006.01)
 G06F 17/30     (2006.01)
(52) U.S. Cl. ........................ 707/793; 707/803
(58) Field of Classification Search ........................ None
See application file for complete search history.

(56) References Cited

U.S. PATENT DOCUMENTS

| 2005/0021536 | A1  | 1/2005  | Fiedler et al. | |
| 2005/0172261 | A1  | 8/2005  | Yuknewicz et al. | |
| 2005/0229186 | A1* | 10/2005 | Mitchell et al. | 719/315 |
| 2006/0294141 | A1* | 12/2006 | Tsang et al. | 707/104.1 |
| 2007/0088716 | A1  | 4/2007  | Brumme et al. | |
| 2008/0005623 | A1* | 1/2008  | Said | 714/46 |
| 2008/0109436 | A1  | 5/2008  | Klein et al. | |
| 2008/0162622 | A1  | 7/2008  | Becker et al. | |
| 2008/0163253 | A1* | 7/2008  | Massmann et al. | 719/316 |

FOREIGN PATENT DOCUMENTS

WO     2005/098593 A2    10/2005

OTHER PUBLICATIONS

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

(Continued)

*Primary Examiner* — Uyen Le
(74) *Attorney, Agent, or Firm* — Buckley, Maschoff & Talwalkar LLC

(57) ABSTRACT

A system may include generation of extension metadata defining an extension node associated with a core node of a business object and extension fields associated with the extension node, and generation of a runtime metadata buffer comprising enhanced metadata, the enhanced metadata based on core metadata of the business object and the extension metadata. In some aspects, a service request associated with the business object is received, it is determined whether the service request is associated with the extension node, an extension service associated with the extension node is provided if it is determined that the service request is associated with the extension node, and a core service associated with core data of the business object is provided if it is determined that the service request is not associated with the extension node.

21 Claims, 5 Drawing Sheets

OTHER PUBLICATIONS

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

"European Search Report of the European Patent Office", mailed Oct. 26, 2009, for EP 09011216.0-1243, 1pg.

"Non-Final Office Action" mailed Mar. 23, 2011, for U.S. Appl. No. 12/339,328, entitled "UI-Driven Binding of Extension Fields to Business Objects", filed Dec. 19, 2008, 22pgs.

"Non-Final Office Action" mailed Aug. 1, 2011, for U.S. Appl. No. 12/339,392, entitled "Flexible Multi-Tenant Support of Metadata Extensions", filed Dec. 19, 2008, 20pgs.

* cited by examiner

FIG. 2

DYNAMIC NODE EXTENSIONS AND EXTENSION FIELDS FOR BUSINESS OBJECTS

FIELD

Some embodiments relate to business objects supported by a business process platform. More specifically, some embodiments relate to the creation and usage of dynamic node extensions for business objects within a business process platform.

BACKGROUND

A business object is a software entity representing real-world items used during the transaction of business. For example, a business object may represent a business document such as a sales order, a purchase order, or an invoice. A business object may also represent items such as a product, a business partner, or a piece of equipment.

A business object may include business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

A customer deploying a business solution may desire changes to the business objects included in the business solution. For example, a customer may require a field (e.g., "Hobbies") which does not exist within the standard "Business Partner" business object of a business solution. Moreover, the customer may wish to associate the field with a new business object node to support a 1:n cardinality (i.e., a single business partner may have more than one hobby).

Conventional techniques do not allow the addition of fields having a 1:n cardinality with an existing node/field. Although it does not support 1:n cardinality, an APPEND mechanism may be used to add a field to an existing node of a business object by changing the definition of the business object at the data dictionary level. An entire database system must be recompiled to effect such a change, and the change occurs globally with respect to all instantiations of the business object within the system.

In some scenarios, particularly service-on-demand scenarios, multiple customers (tenants) receive services from a single application platform. If one of the multiple tenants adds an extension field to a business object using a conventional technique as described above, each other tenant would be forced to adapt to the additional extension field.

Systems for adding a node and corresponding extension field to a business object are desired. Such a system may reduce a need for recompiling the application platform, may enable one or more tenants to add one or more extension nodes/fields, and/or may provide tenant-specific views of tenant-specific nodes/fields.

BRIEF DESCRIPTION OF THE DRAWINGS

FIG. 2 is a view of a user interface for adding an extension node and extension fields to a system according to some embodiments.

DETAILED DESCRIPTION

Figure 1:
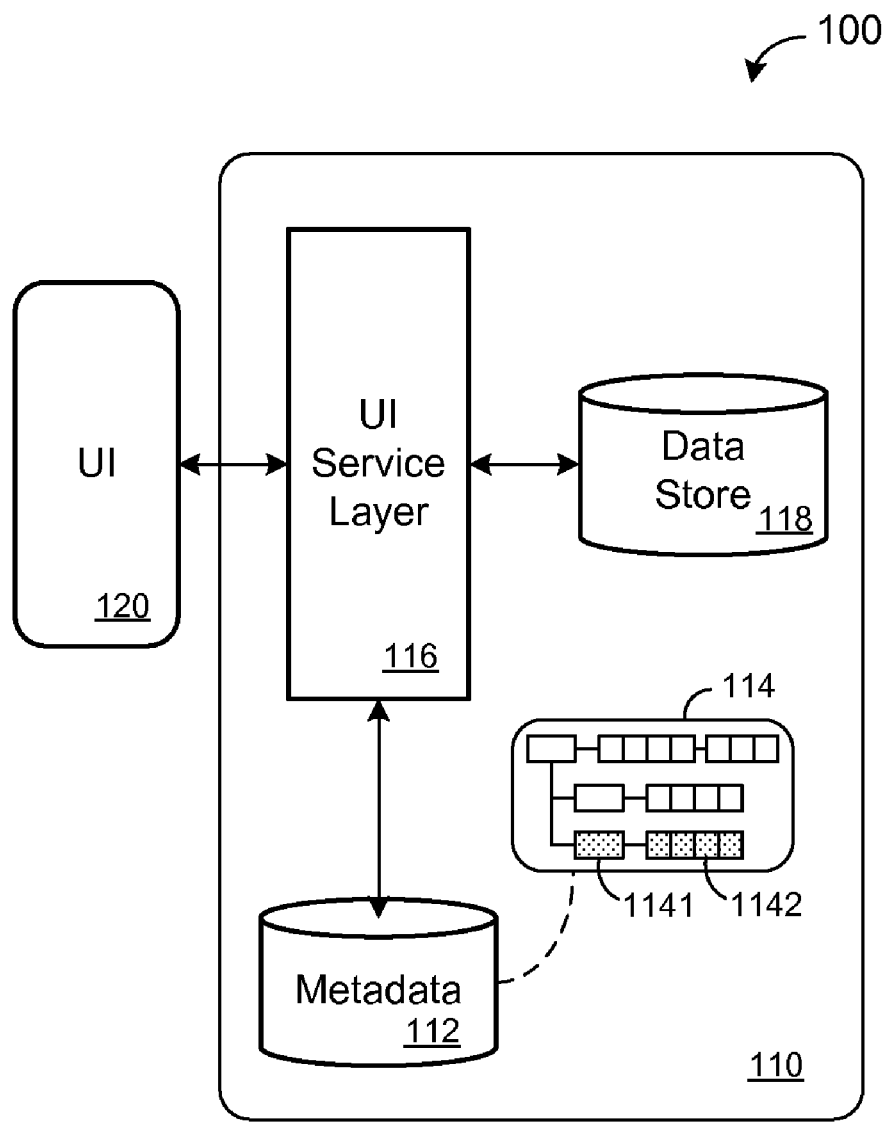
FIG. 1 is a block diagram of components to add an extension node and extension fields to a core node of a business object according to some embodiments.

FIG. 1 is a block diagram of system 100 according to some embodiments. System 100 includes business process platform 110 and user interface 120. Generally, business process platform 110 may provide services to user interface 120 according to some embodiments. Business process platform 110 may comprise an SAP application platform based on SAP Netweaver®, but is not limited thereto. In this regard, FIG. 1 represents a logical architecture for describing processes according to some embodiments, and actual implementations may include more or different components arranged in other manners.

Business process platform 110 may provide services based on business objects as described above. Metadata 112 may include information defining the structure and attributes of these business objects such as business object 114. UI service layer 116 may use metadata 112 to access and manipulate business object data stored in data store 118.

An operator (e.g., a key user) may manipulate user interface 120 to interact with UI service layer 116 according to some embodiments. Such interactions may include requesting business object views, modifying business object data, and defining business object views. User interface 120 may be displayed by any suitable device. For example, the device may include any necessary software to support a proprietary interface (e.g., a proprietary client application) or execution engine (e.g., a Web browser). A device to display the user interfaces is capable of communication (including sporadic communication—e.g., mobile devices) with business process platform 110.

Figure 2:
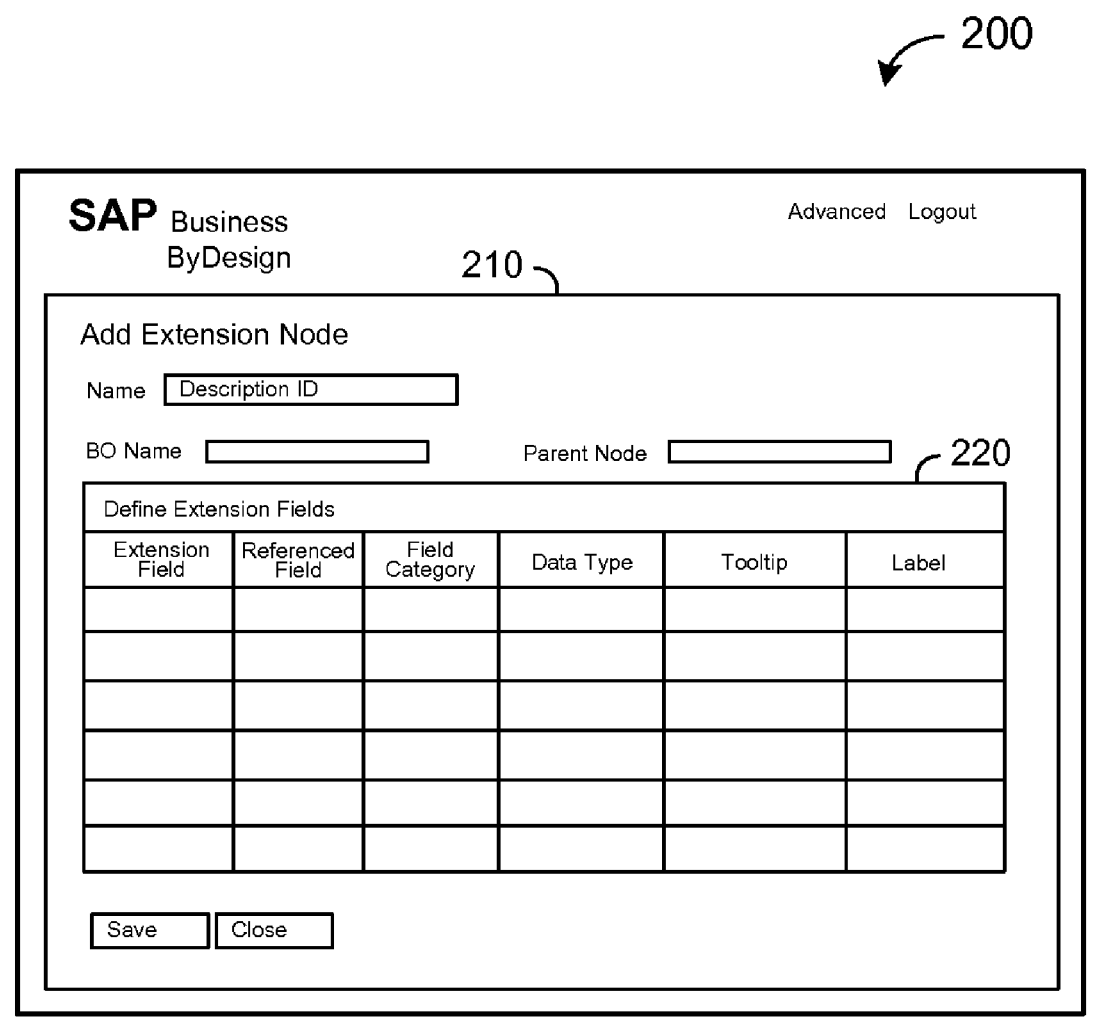

FIG. 2 illustrates user interface 200 according to some embodiments. The key user may access user interface 200 through a user interface adaptation dialog provided by UI service layer 116. User interface 200 allows the user to define an extension node and corresponding extension fields associated with a business object.

A user may populate the fields of area 210 to define a new extension node, as well as extension fields for the new extension node. According to the illustrated embodiment, the fields allow a user to define a name of the extension node and to identify a business object and a node of the business object with which the new extension node will be associated. Area 220 allows the user to specify extension fields for the extension node and attributes associated with each extension field. Areas 210 and 220 may include other or different fields according to some embodiments, and such fields may be populated using drop-down menus or any other input mechanism.

In response, metadata 112 associated with business object 114 is changed to reflect extension node 1141 and extension fields 1142. As illustrated, extension node 1141 is a sub-node of the root node of business object 114. Extension node 1141 may be associated with any other core node of business object 114 according to some embodiments. Extension node 1141 and fields 1142 are also created in persistent data store 118.

Figure 3:
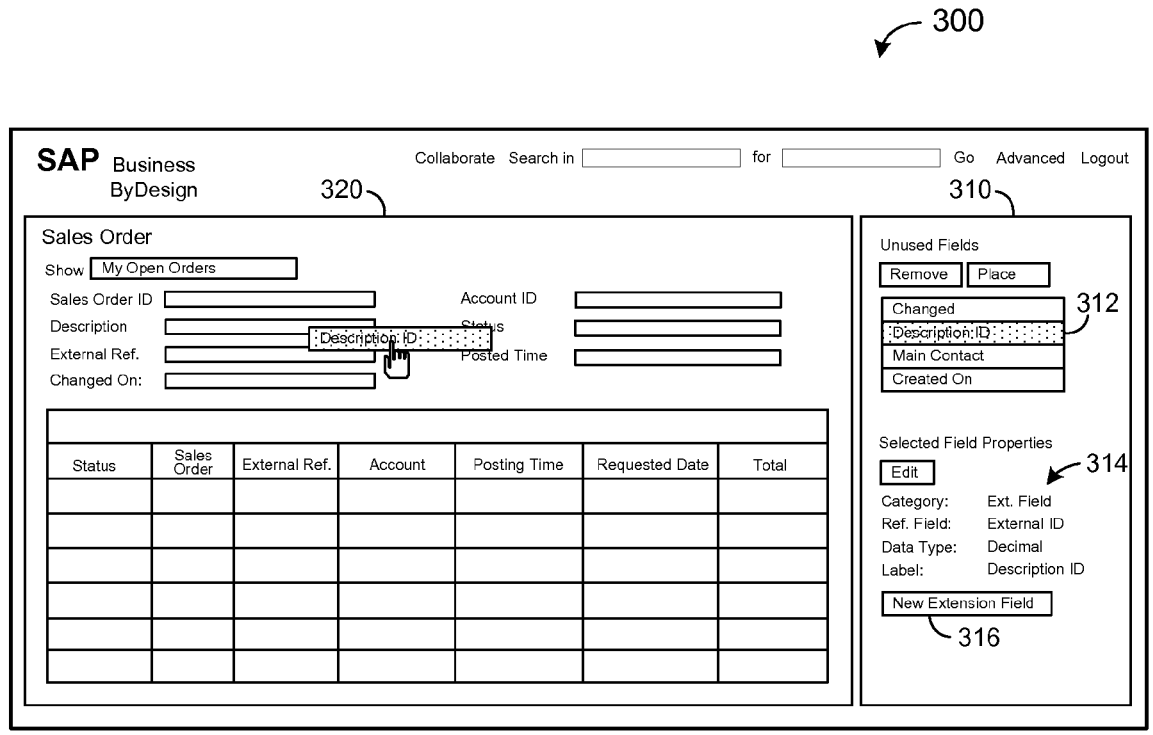
FIG. 3 is a view of a user interface for adding an extension field of an extension node to a floorplan according to some embodiments.

An existing user interface (i.e., floorplan) served by UI service layer 116 may be changed to include the new extension node and field(s). FIG. 3 illustrates adaptation dialog 300 including extensibility toolset 310 and user interface 320. Adaptation dialog 300 reflects an on-demand Web-based solution in which dialog 300 is displayed by a Web browser.

User interface 320 is associated with a business object and served by UI service layer 116. Extensibility toolset 310 includes a list of fields of associated with the business object. The listed fields may include core fields and previously-defined extension fields of extension nodes. Dialog 300 illustrates selection of extension field "Description ID" 312 from toolset 310 and dragging of an icon representing the extension field into a desired area of user interface 320.

Extensibility toolset 310 also provides Field Properties area 314 to view and edit properties (i.e., attributes) of the selected extension field. Moreover, a user may select New Extension Field link 316 to define a new extension field for the same or different node. In some embodiments, a key user invokes adaptation dialog 300 directly from user interface 320 and then invokes user interface 200 therefrom using link 316. Any change to the floorplan may be enabled by UI service layer 116 through appropriate communication with metadata 112 and data store 118.

In some embodiments, a search interface associated with the changed user interface may be adapted to account for the newly-added extension field. Related forms and analytics may also be adapted to access the new extension field using appropriate design tools and service layers of platform 110. As mentioned above, these adaptations may result in corresponding changes to metadata 112 of the affected business object and the persistences of the business object stored in data store 118.

Many systems and approaches may be employed to represent extension node 1141 and fields 1142 within data store 118 and metadata 112. Extension node/field data of particular instances of a business object may be coupled to the lifecycle of core data of the business object persisted in data store 118. According to some embodiments, extension data of a particular instance is associated with a same NodeId as core data of the same instance. In some embodiments, core data of each business object includes a field for storing a pointer to extension data.

For each created extension node, metadata 112 may include an extension node name, a core node with which the extension node is associated, and names of one or more extension fields. Metadata 112 may also include a technical (e.g., ABAP) name of the node and each field.

In contrast to conventional field extensibility mechanisms such as those described above, it may be desired to avoid redefining an extended business object at a data dictionary level. Accordingly, in order to provide "dynamic" addition of the extension data, metadata 112 of business object 114 may be enhanced to define extension node 1141 with extension fields 1142 as attributes, and to define an association between a core node of business object 114 and extension node 1141.

Tenant-specific extension fields may be enabled by adhering to naming conventions within metadata 112. For a specific node, each tenant extension (EXTENSION1 and EXTENSION2) may be specified as follows:

```
DYNAMIC_EXTENSION_DATA_TYPE
    /EXTENSION1/FIELDS
        FIELD1
        FIELD2
    /EXTENSION2/FIELDS
        FIELD1
        FIELD2
```

Figure 4:
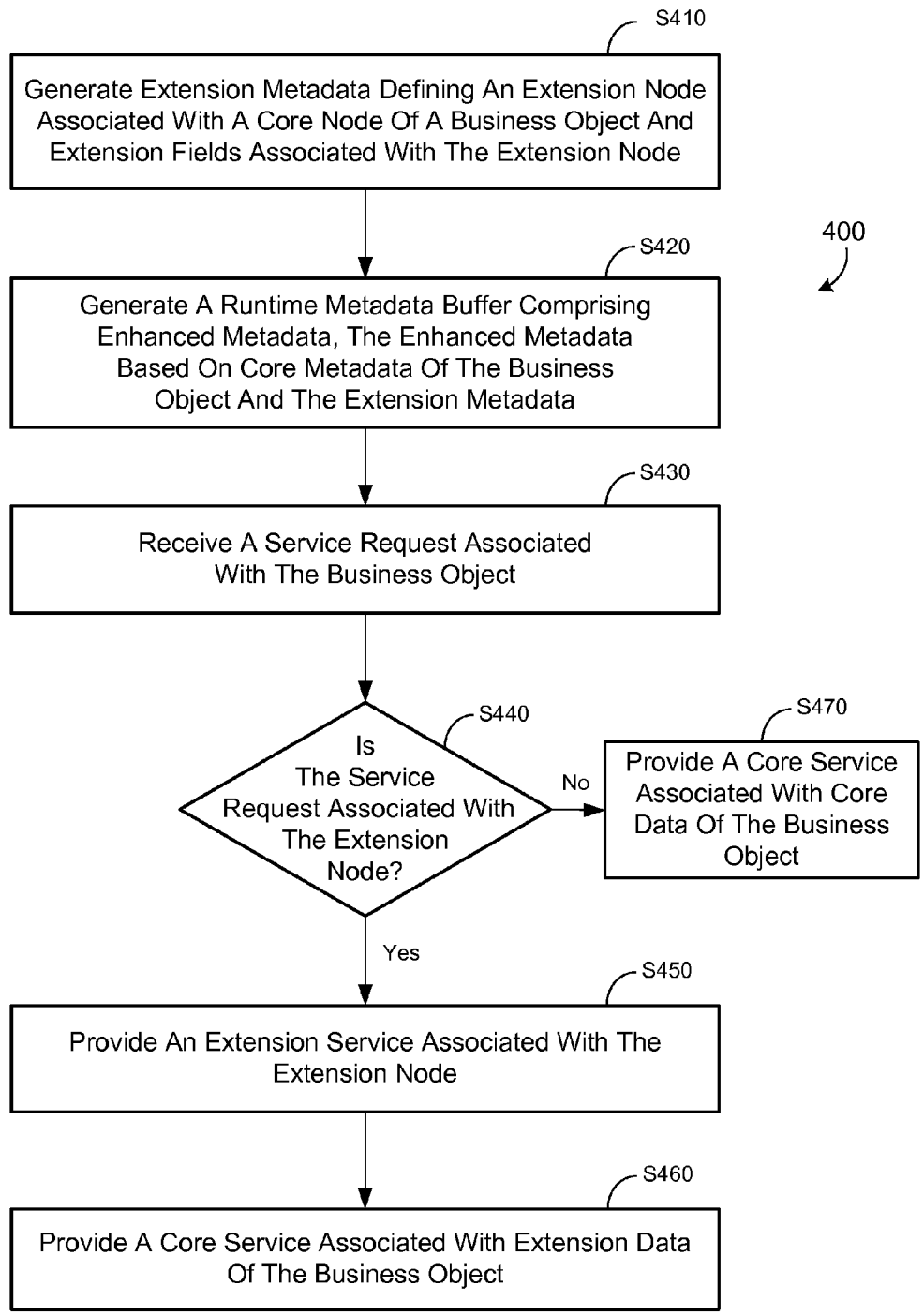
FIG. 4 is a flow diagram of a process according to some embodiments.
Figure 5:
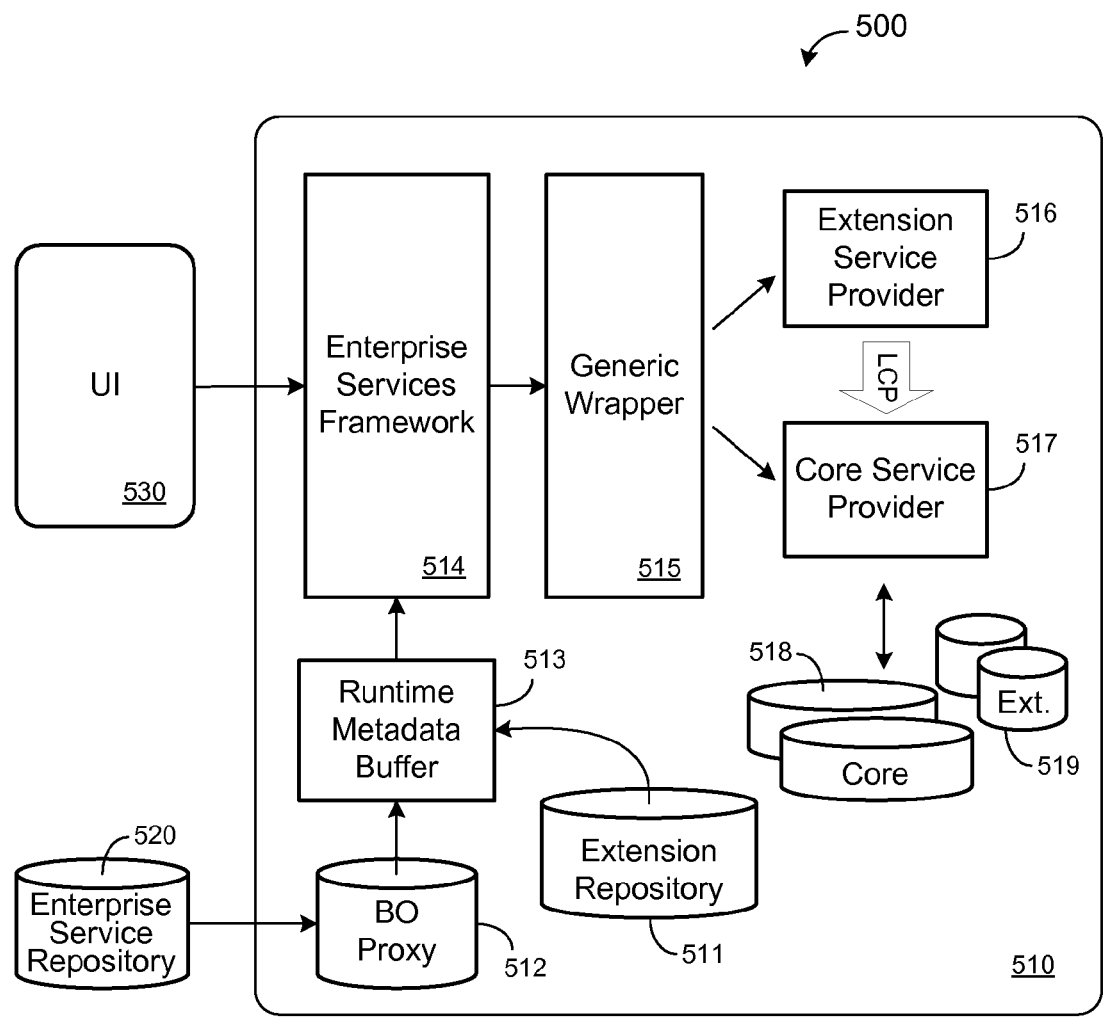
FIG. 5 is a detailed block diagram of a system according to some embodiments.

FIG. 4 is a flow diagram of process 400 to support business objects including extension nodes and fields according to some embodiments. FIG. 5 is a detailed block diagram of system 500 to execute process 400 according to some embodiments. Process 400 may be executed by systems differing from system 500, and system 500 is not limited to process 400.

Initially, extension metadata is generated at S410. The extension metadata defines an extension node associated with a core node of a business object. The extension metadata also defines extension fields associated with the extension node. The core node may be a root node of the business object or a child node of the business object. According to some embodiments, the extension metadata is generated by a UI service layer in response to key user input as described above with respect to FIGS. 1 and 2.

The extension metadata may comprise an extension node name, a name of a core node with which the extension node is associated, and names of one or more extension fields. The extension metadata may also include a technical name of the node and of each field, and may be generated and stored in a tenant-specific manner as described above. According to some embodiments, the extension metadata is generated and stored within extension repository 511 of business process platform 510. The extension metadata may be stored in any other entity within application platform 510.

The extension metadata may be generated at S410 during execution of platform 510. In this regard, enterprise service repository 520 may include business object models for use by platform 510. For each business object model, a business object proxy 512 including core business object metadata is generated in platform 510.

A runtime metadata buffer including enhanced metadata is generated at S420. The enhanced metadata is based on core metadata of a business object and the extension metadata of the business object generated at S410. In the FIG. 5 example, runtime metadata buffer 513 is generated to include enhanced metadata based on the core metadata of business object proxy 512 and the extension metadata of extension repository 511. The enhanced metadata may include all extension nodes and associated extension fields defined in platform 510, or may include only extension nodes/fields specific to a particular tenant.

Next, at S430, a service request associated with the business object is received. For example, business process platform 510 may receive a "modify" or "retrieve" request from user interface 530 at S430. The request is directed to enterprise service framework 514.

According to conventional operation, enterprise service framework 514 then calls an appropriate core service provider based on metadata associated with the business object in buffer 513. According to process 400, however, it is determined at S440 whether the received service request is associated with the extension node.

Generic wrapper 515 may be instantiated to perform the determination at S440. Generic wrapper 515 may base the determination on the enhanced metadata of extension repository 511, and/or on similarly-enhanced metadata stored in an extension registry (not shown). Flow proceeds to S450 if it is determined that the service request is associated with the extension node.

At S450, an extension service is provided. The extension service is associated with the extension node and at least one of the extension fields of the extension node. FIG. 5 illustrates extension service provider 516 being called by generic wrapper 515 according to some embodiments. Extension service provider 516 may handle the attributes of the extension node, which are not supported by core service provider 517.

Extension service provider 516 may comprise a class implementing a set of well-defined interfaces. The interfaces of extension service provider 516 may provide initialization of the extension in order to obtain an instance of a local client proxy (LCP) to communicate with core service provider 517. The interfaces may implement pre- and post-exits for existing core services. For example:

```
IF_EXT_PROVIDER_ACCESS
    PRE_MODIFY
    POST_MODIFY
    PRE_RETRIEVE
    POST_RETRIEVE
    ...
IF_EXT_PROVIDER_ACTION
    PRE_EXECUTE_ACTION
    POST_EXECUTE_ACTION
    ...
```

Generally, signatures of the foregoing methods may be derived from the signature of the corresponding core services (e.g., EXPORTING parameters become CHANGING parameters).

Core service provider 517 is called at S450 to provide a core service. The core service is associated with extension data of the extension node. More specifically, extension service provider 516 may use an LCP instance to request a core service from core service provider 517. The core service may support extension data of one or more extension fields of the extension node.

Returning to S440, generic wrapper 515 may directly call core service provider 517 if it is determined that the service request is not associated with the extension node. Flow then proceeds to S470, at which point core service provider 517 provides a core service associated with the core data of the business object. Core service provider 517 may access core data 518 to provide core services based on the request. In the illustrated example, core data 518 is stored separately from extension data 519.

Each system described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A method comprising:
   generating, by a computer, extension metadata defining an extension node associated with a core node of a business object and extension fields associated with the extension node; and
   generating, by a computer, a runtime metadata buffer comprising enhanced metadata, the enhanced metadata based on core metadata of the business object and the extension metadata.

2. A method according to claim 1, further comprising:
   generating, by a computer, a business object proxy comprising the core metadata of the business object based on a model of the business object,
   wherein the enhanced metadata is generated based on the core metadata of the business object proxy.

3. A method according to claim 2, wherein the model of the business object is stored in an enterprise services repository,
   wherein the business object proxy is generated in a business process platform, and
   wherein the extension metadata is stored in an extension repository of the business process platform.

4. A method according to claim 1, further comprising:
   receiving a service request associated with the business object;
   determining, by a computer, whether the service request is associated with the extension node;
   if it is determined that the service request is associated with the extension node, providing an extension service associated with the extension node; and
   if it is determined that the service request is not associated with the extension node, providing a core service associated with core data of the business object.

5. A method according to claim 4,
   wherein determining whether the service request is associated with the extension node is based on the enhanced metadata of the runtime metadata buffer.

6. A method according to claim 4, further comprising:
   providing, by a computer, a core service associated with extension data of at least one of the extension fields of the extension node if it is determined that the service request is associated with the extension node.

7. A method according to claim 1,
   wherein the extension repository stores extension metadata associated with a plurality of database tenants, and
   wherein the enhanced metadata is associated with a single database tenant.

8. A system comprising:
   an extension repository storing extension metadata defining an extension node associated with a core node of a business object and defining extension fields associated with the extension node; and
   a runtime metadata buffer comprising enhanced metadata, the enhanced metadata based on core metadata of the business object and the extension metadata.

9. A system according to claim 8, further comprising:
   a business object proxy comprising the core metadata of the business object,
   wherein the enhanced metadata is based on the core metadata of the business object proxy.

10. A system according to claim 9, further comprising:
    an enterprise services repository storing a model of the business object; and
    a business process platform comprising the business object proxy and the extension repository.

11. A system according to claim 8, further comprising:
    an enterprise services framework to receive a service request associated with the business object;
    a generic wrapper class to determine whether the service request is associated with the extension node;

an extension service provider to provide an extension service associated with the extension node if it is determined that the service request is associated with the extension node; and a core service provider to provide a core service associated with core data of the business object if it is determined that the service request is not associated with the extension node.

12. A system according to claim 11,
wherein the generic wrapper class is to determine whether the service request is associated with the extension node based on the enhanced metadata of the runtime metadata buffer.

13. A system according to claim 11, wherein the extension service provider is to call the core service provider to provide a core service associated with extension data of at least one of the extension fields of the extension node.

14. A system according to claim 8,
wherein the extension repository stores extension metadata associated with a plurality of database tenants, and
wherein the enhanced metadata is associated with a single database tenant.

15. A non-transitory computer readable medium storing program code executable by a computer to perform a method, the method comprising:
generating extension metadata defining an extension node associated with a core node of a business object and extension fields associated with the extension node; and
generating a runtime metadata buffer comprising enhanced metadata, the enhanced metadata based on core metadata of the business object and the extension metadata.

16. A method according to claim 15, further comprising:
generating a business object proxy comprising the core metadata of the business object based on a model of the business object,
wherein the enhanced metadata is generated based on the core metadata of the business object proxy.

17. A method according to claim 16, wherein the model of the business object is stored in an enterprise services repository,
wherein the business object proxy is generated in a business process platform, and
wherein the extension metadata is stored in an extension repository of the business process platform.

18. A method according to claim 15, further comprising:
receiving a service request associated with the business object;
determining whether the service request is associated with the extension node;
if it is determined that the service request is associated with the extension node, providing an extension service associated with the extension node; and
if it is determined that the service request is not associated with the extension node, providing a core service associated with core data of the business object.

19. A method according to claim 18,
wherein determining whether the service request is associated with the extension node is based on the enhanced metadata of the runtime metadata buffer.

20. A method according to claim 18, further providing a core service associated with extension data of at least one of the extension fields of the extension node if it is determined that the service request is associated with the extension node.

21. A method according to claim 15,
wherein the extension repository stores extension metadata associated with a plurality of database tenants, and
wherein the enhanced metadata is associated with a single database tenant.

* * * * *